(12) United States Patent
Stone

(10) Patent No.: US 7,992,706 B2
(45) Date of Patent: Aug. 9, 2011

(54) LIMITED FORCE, SELF LOCKING TENSIONER

(75) Inventor: Bryan J. Stone, Dallas, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 78 days.

(21) Appl. No.: 12/590,604

(22) Filed: Nov. 10, 2009

(65) Prior Publication Data

US 2010/0116628 A1   May 13, 2010

Related U.S. Application Data

(60) Provisional application No. 61/113,269, filed on Nov. 11, 2008.

(51) Int. Cl.
   *B65G 15/30*   (2006.01)
(52) U.S. Cl. ........................................... 198/816
(58) Field of Classification Search .......... 198/813, 198/816, 807
   See application file for complete search history.

(56) References Cited

U.S. PATENT DOCUMENTS

| | | | | |
|---|---|---|---|---|
| 832,361 | A | * | 10/1906 | Blevins .................... 198/816 |
| 1,489,753 | A | * | 4/1924 | Fraley ...................... 198/308.1 |
| 4,079,834 | A | * | 3/1978 | Fletcher et al. .......... 198/810.04 |
| 5,776,025 | A | | 7/1998 | Labudde et al. |
| 6,217,470 | B1 | | 4/2001 | Quintus |
| 6,298,981 | B1 | * | 10/2001 | Hosch et al. .................. 198/813 |
| 6,605,013 | B2 | | 8/2003 | Chambers et al. |
| 7,118,504 | B2 | | 10/2006 | Meckstroth et al. |
| 7,273,432 | B2 | | 9/2007 | Schonmeier et al. |
| 7,448,491 | B1 | * | 11/2008 | Tippery et al. ............... 198/813 |
| 7,556,069 | B2 | * | 7/2009 | Chuang ..................... 144/114.1 |

FOREIGN PATENT DOCUMENTS

JP   60222636 A * 11/1985 ................. 198/813

OTHER PUBLICATIONS

U.S. Appl. No. 12/186,122, filed Aug. 5, 2008.

* cited by examiner

*Primary Examiner* — Mark A Deuble
(74) *Attorney, Agent, or Firm* — Filip A. Kowalewski

(57) ABSTRACT

A tensioning device configured for use in a conveyor system as an idler roller over which a belt is wound under tension includes a housing, an arm mounted in the housing for linear movement in and out of the housing, a roller mechanism mounted at a distal end of the arm including a roller configured for rolling contact with a belt of a conveyor system, and an actuator for extending and retracting the arm from the housing. The actuator includes a worm shaft and a lead screw. A pinion of the worm shaft engages a gear affixed at one end of the lead screw. The tensioning device includes a coupling by which rotation of the lead screw results in outward movement of the arm when the worm shaft is rotated in a first direction, and which results in inward movement of the arm when the worm shaft is rotated in the opposite direction. Engagement of the worm shaft to the gear is self-locking.

4 Claims, 4 Drawing Sheets

LIMITED FORCE, SELF LOCKING TENSIONER

This application claims priority of U.S. provisional application No. 61/113,269 filed Nov. 11, 2008.

FIELD OF THE INVENTION

The invention relates to tensioning devices for maintaining tension in belts used in postal sorting machines.

BACKGROUND OF THE INVENTION

A pickoff mechanism is used in flat mail sorting machines to remove letters or the like one piece at a time from a stack of mail held edgewise against the pickoff mechanism. One such mechanism is shown in commonly-assigned U.S. patent application Ser. No. 12/186,122 filed Aug. 5, 2008, the contents of which are incorporated by reference herein.

Known pickoff mechanisms comprise a set of rubber belts side by side wound over a drive roller and a follower or idler roller. The belts engage the endmost mail piece of the stack and rely on friction to pull it sideways off of the stack and into the entry nip of the pinch belt conveyor. Friction is created by the pressure of the mail stack as it advances into contact with the pickoff belts. The stack is carried by a horizontal belt conveyor, and its remote end is supported by a paddle movably mounted on a frame of the feeder. The paddle and belt are synchronized to move the stack forward in increments. This is controlled by a letter present sensor, for example, an optical displacement sensor or a mechanical proximity switch using a spring arm which indicates to the feeder controller that the end of the stack is in engagement with the outer face of the pickoff belts.

The follower roller is adjusted (moved away from the drive roller) to create tension in the pickoff belts. Existing pick off belts tensioning devices use linear springs, an asymmetrical lever, and a cam to set tension. In these prior systems an Allen key is required to change the belt tension, and often a screw driver is used as a lever to increase/decrease tension if friction in the system becomes so great that the spring does not generate sufficient belt tension. Maintaining sufficient belt tension directly contributes to throughput of the pickoff mechanism, and the existing system proved insufficient for use in the DBCS 7 model postal sorting machine.

SUMMARY OF THE INVENTION

The invention provides a tensioning device that prevents over tensioning of a conveyor belt by limiting the input force that is required to extend an idler roller to produce tension. The device is preferably self locking and thus does not require a secondary action to hold the belt in tension. "Self-locking" for purposes of the invention has the meaning that a belt wound on the roller as part of a conveyor or pickoff system is not able to drive the tensioning mechanism in a reverse direction tending to retract the arm and roller assembly, such that no separate locking mechanism is required.

A tensioning device configured for use in a conveyor system as an idler roller over which a belt is wound under tension includes, according to one aspect of the invention a housing, an arm mounted in the housing for linear movement in and out of the housing, a roller mechanism mounted at a distal end of the arm, including a roller configured for rolling contact with a belt of a conveyor system, and an actuator for extending and retracting the arm from the housing. The actuator includes a worm shaft and a lead screw. A pinion of the worm shaft engages a gear affixed at one end of the lead screw. The tensioning device further includes a coupling by which rotation of the lead screw results in outward movement of the arm when the worm shaft is rotated in a first direction, and which results in inward movement of the arm when the worm shaft is rotated in a second direction opposite the first direction. Engagement of the worm shaft to the gear is self-locking.

In a preferred embodiment, the lead screw is oriented perpendicularly to the worm shaft in the housing, and the actuator includes a manually rotatable knob.

These and other aspects of the invention are described further in the detailed description that follows. It is to be understood that terms used herein not otherwise defined should be given their meanings recognized in the postal sorting art, if applicable, not more general definitions found in unspecialized dictionaries.

DETAILED DESCRIPTION

Figure 1:
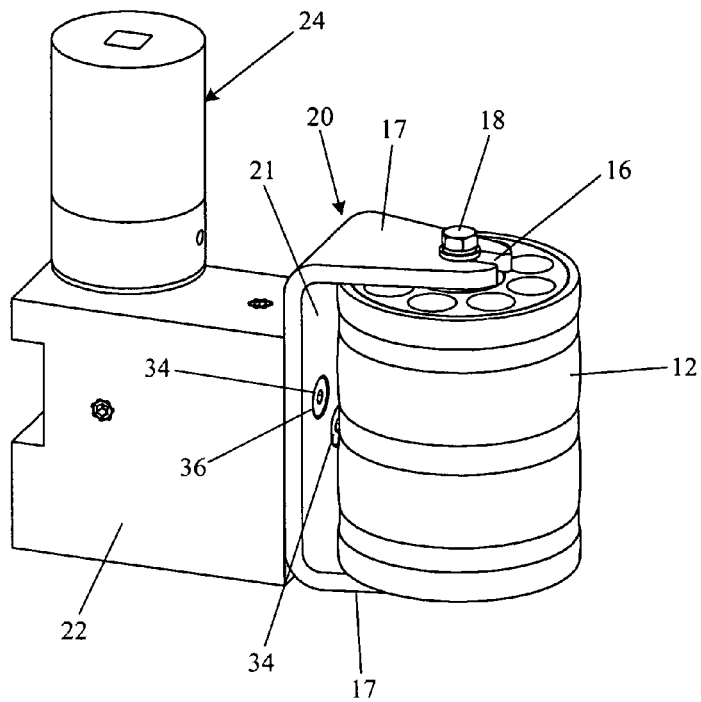
FIG. 1 is a side perspective view of a tensioner according to the invention.

Referring to FIGS. 1-6, a belt tensioner 10 according to the present invention includes a cylindrical idler roller 12 mounted on a tubular axle 14 that extends through a central axial through-hole 15 in roller 12. Axle 14 also extends through outwardly opening notches 16 in a pair of lateral flanges 17 at opposite ends of roller 12. A set screw 18 is threadedly secured in the top end of axle 14 and clamps the top flange 17 against the upper end of axle 14. A second such screw can be used at the bottom end of axle 14. Roller 12 is rotatably supported on axle 14 by a pair of bearings 15.

Flanges 17 are part of a C-shaped bracket 20. Bracket 20 mounts the roller assembly as described above to a block shaped housing 22. Housing 22 has a control knob assembly 24 mounted thereon which assembly 24 is used to operate an extension-retraction mechanism 25 for an arm 26. Passages machined in housing block 22 accommodate arm 26 and a lead screw 28. In this embodiment arm 26 comprises a sleeve 30 having a central axial hole (bore) 32 therein in which the distal end of screw 28 is disposed. Sleeve 30 is secured to bracket 20 by a pair of screws 34 the heads of which engage countersunk holes 36 in the front side of a rear wall 21 of bracket 20 and which are secured in threaded holes 35 in the annular front end face of sleeve 30 at positions offset from bore 32. It is also possible to secure bracket 20 to arm 26 by welding, adhesive cement or other fastening means.

Outward movement of arm 26 relative to housing block 22 results in forward movement of the roller assembly. Such movement results from rotation of lead screw 28. Screw 28 has a nut 38 threadedly mounted on a mid-portion thereof. Nut 38 engages on the inside of sleeve 30, that is, a rear shoulder 40 of nut 38 engages a step 42 on the inside of sleeve 30 at a forward end of an annular groove. By this means forward movement of nut 38 pushes arm 26 forward (further forward) into an extended position. A rear wall of 39 of sleeve 30 engages the rear end of nut 38 so that rearward movement of nut 38 retracts arm 26 of which sleeve 30 is part.

Movement of nut 38 is caused by means of rotation of lead screw 28. Lead screw 28 is driven by means of extension-retraction mechanism 25 which is manually operated using control knob assembly 24 in the embodiment shown. Knob assembly 24 includes upper and lower knob sections 51 and 52 united by means of a conventional slip clutch or torque limiting mechanism 53, such as a torque reducer sold as Perf a Torq sold by Geartronics Industries Incorporated, which has dimensions suitable for use in knob assembly 24.

Rotation in tandem of upper knob section 51 and lower knob section 52 operatively connected by the slip clutch in either direction occurs freely as long as the resistance as described hereafter is below a threshold level. Lower knob section 52 has a worm shaft 54 extending downwardly therefrom into housing 22 at the end opposite from the roller mechanism. A pinion 55 at the distal end of worm shaft 54 engages a gear 56 at a rear end of lead (drive) screw 22. Manual rotation of knob assembly 24 in a clockwise direction thereby results in rotation of screw 22 causing nut 38 to rotate and advance a small distance to extend arm 26. Counterclockwise rotation has the opposite effect, causing nut 38 to move rearwardly along screw 22 engaging shoulder 39, thereby moving arm 26 and the attached roller assembly rearwardly, lessening tension on the conveyor belts engaged by the roller 22.

A highly useful feature of the invention is the self locking nature of the drive gears. The engagement between worm pinion 55 of worm shaft 54 and gear 56 is such that, due to the nature of the worm to gear connection, it is able to transmit rotation of the knob assembly 24 into outward movement of the arm 26 and roller assembly mounted on it. On the other hand, pressure exerted by the pickoff belt(s) on the roller 22 is transmitted to arm 26, but the worm to gear connection resists such pressure and does not permit arm 26 to retract due to the force exerted by the conveyor belt(s). This is important for maintaining constant belt tension during use.

Figure 2:
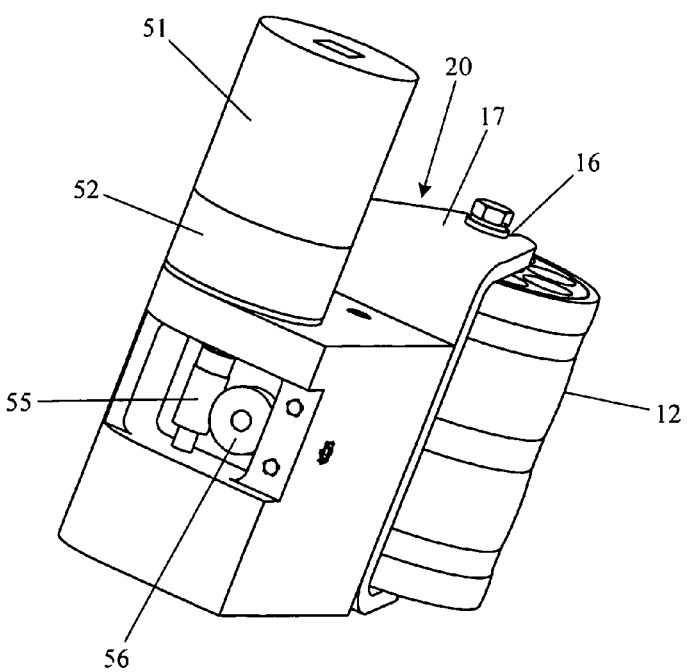
FIG. 2 is a rear perspective view of the tensioner of FIG. 1.
Figure 3:
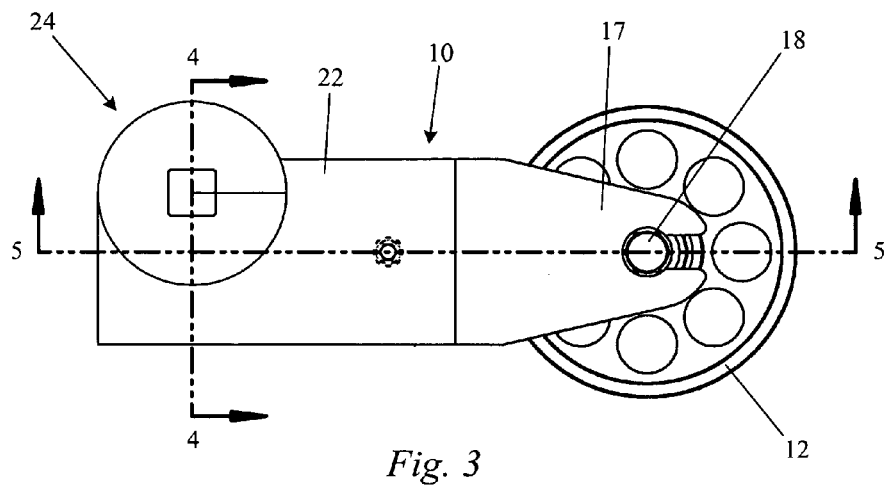
FIG. 3 is a top view of the tensioner of FIG. 1.
Figure 4:
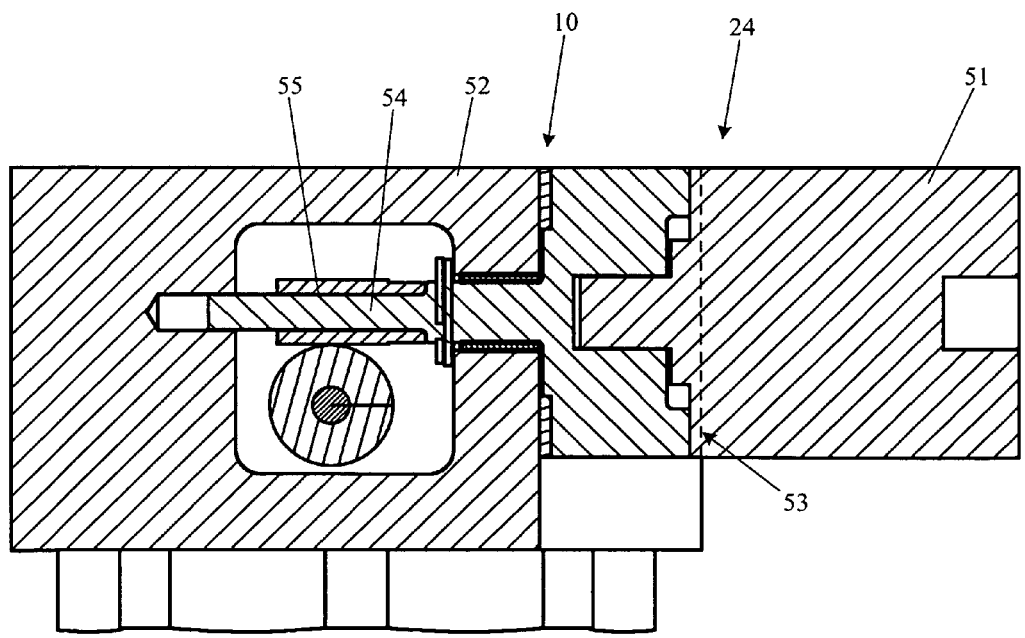
FIG. 4 is a sectional view taken along the line 4-4 in FIG. 3.
Figure 5:
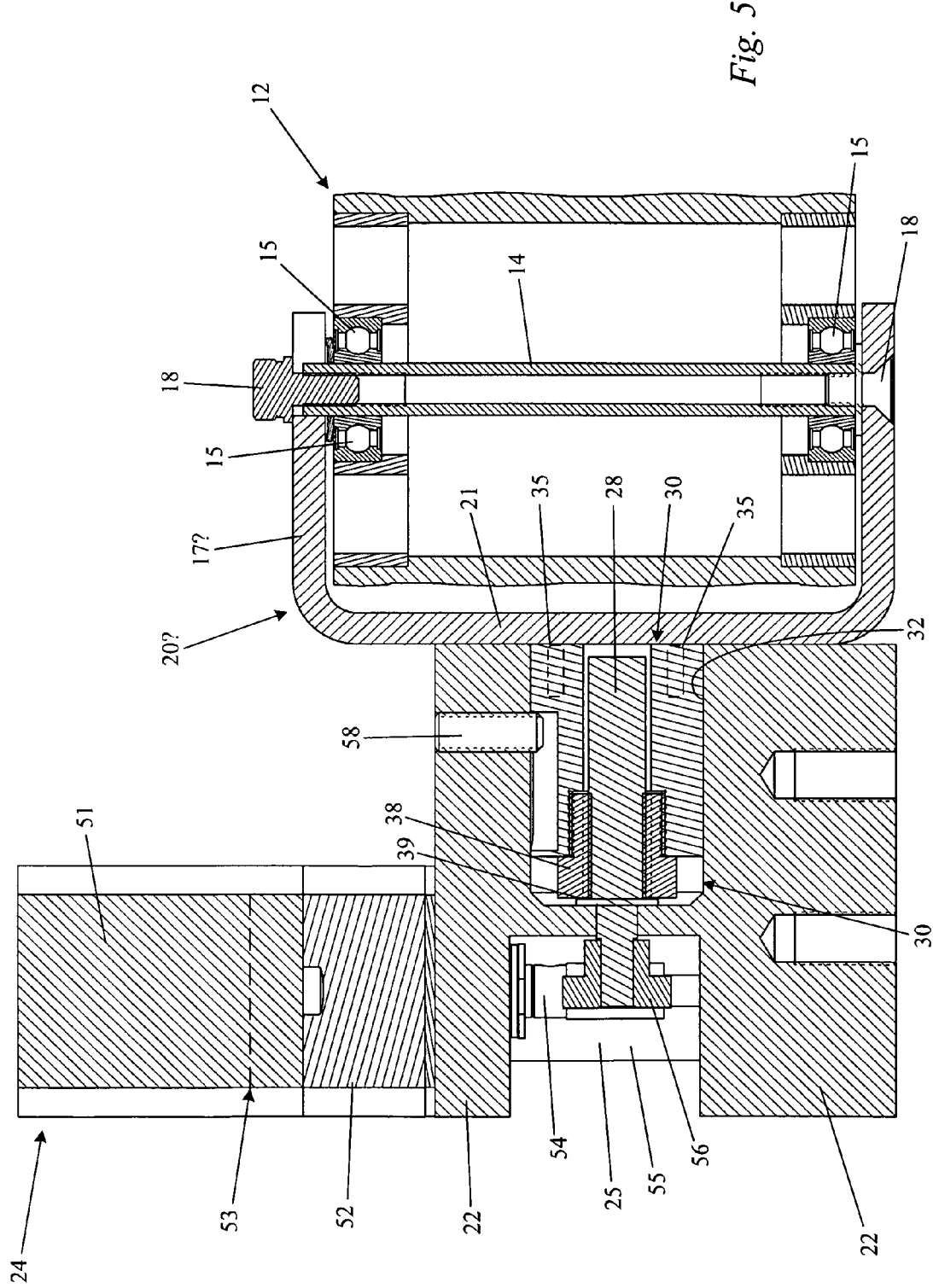
FIG. 5 is a sectional view taken along the line 5-5 in FIG. 3.
Figure 6:
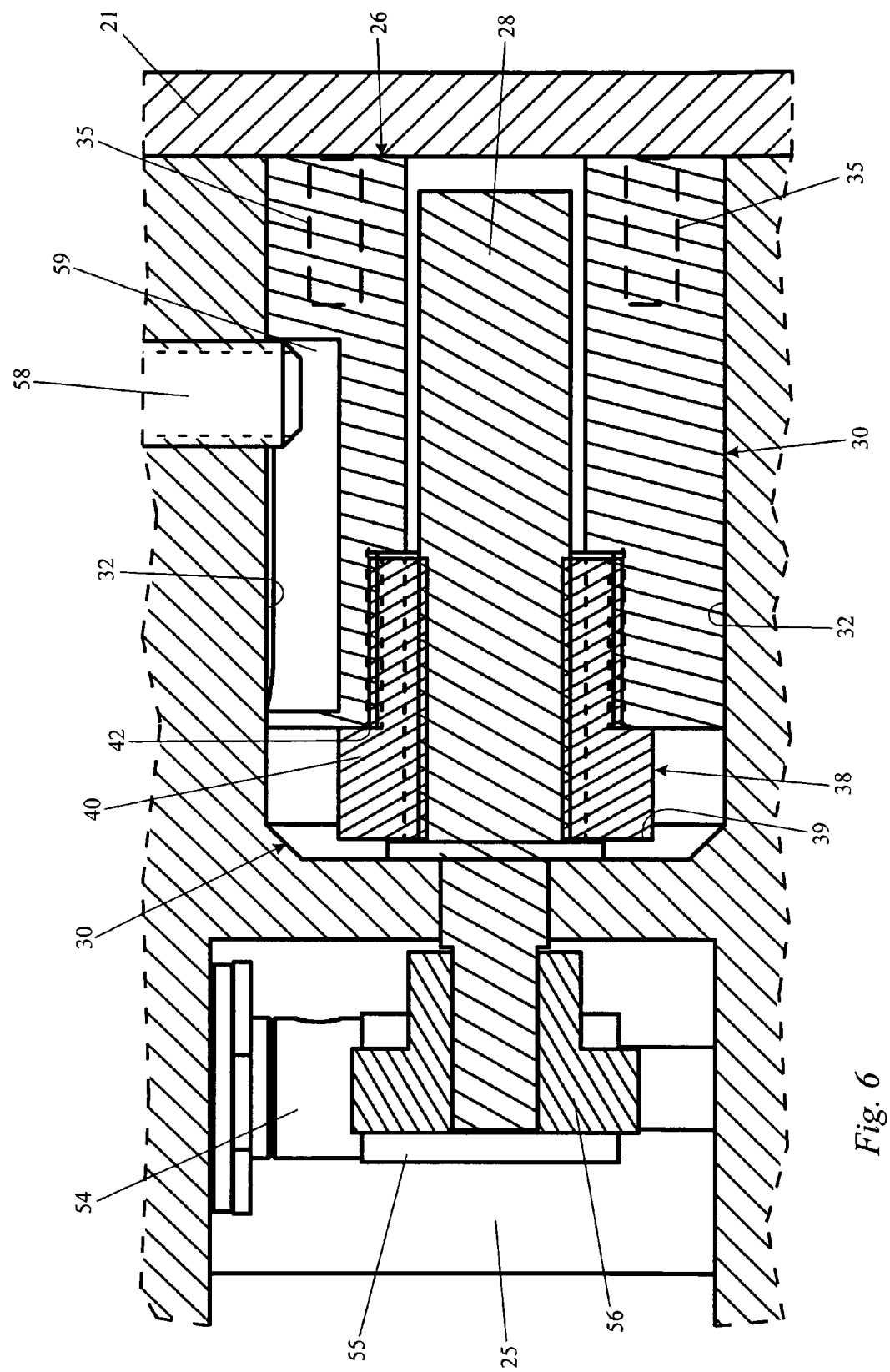
FIG. 6 is an enlarged view of a left-central portion of FIG. 5.

As shown in FIGS. 2 and 3 of the foregoing application Ser. No. 12/186,122 which has been incorporated by reference, in typical operation in a pickoff mechanism one or more belts are wound under tension over the drive roller at one end and an idler (follower) roller at the other. An idler roller having a tensioning device according to the present invention used in such an environment has one or more belts wound about its circumferential surface. These belts push back on the roller mechanism and arm 26 in proportion to the belt tension. As this force becomes greater, the rotary force that has to be exerted on knob assembly 24 to further extend arm 26 likewise increases. A stop 58 takes the form of a pin inserted in a hole 59. A rear enlarged diameter portion of sleeve 30 engages stop 58 is it reaches a fully extended position, stop 58 prevents over-extension of arm 26.

The use of a slip clutch or torque limiter 53 in the present invention provides the ability to prevent over-tightening of the belt engaged by the idler roller. As a user manually continues to extend arm 26 and the roller assembly mounted on it, the tension on the belt(s) engaged by the roller increases. At a predetermined level such tension is deemed excessive such that it is likely to result in belt failure, even though short of the position at which stop 58 is engaged. Greater and greater force is needed to turn the knob mechanism 24 as the belt tension increases. At a predetermined level of tension the slip clutch 53 causes upper knob section 51 gripped by the user to slip (pivot) and become mechanically decoupled from lower knob section 52, so that no further movement of worm shaft 54 in the direction that advances arm 26 occurs. Movement of knob assembly 24 in the retraction direction (i.e. turning knob section 51 counterclockwise is not hindered by the slip clutch unless the force need to turn knob section 51 becomes excessive relative to the trigger point of the slip clutch.

According to the invention the ratio of the worm/pinion and lead screw (22) may be altered to achieve different linear distances per revolution of input. The tensioner 10 also positions the idler roller perpendicular to the base belt that it engages. The idler roller should be precisely positioned to prevent tracking issues. Due to the self locking nature of the gears, tensioner 10 maintains a constant tension force in the pick off belt regardless of the % of belt elongation. By comparison, the prior art spring driven tension device produces its highest tension with new pick off belts and the force decreases as the belts stretch and relax. The tensioner of the invention provides repeatable performance and gives a measurable, discreet setting that eliminates variability among machines. In addition, the tensioner of the invention provides a method to increase or decrease pick off belt tension in the feeder without the use of tools. Existing pick off belts tensioning devices use linear springs, an asymmetrical lever, and a cam to set tension. In this prior tensioner, an Allen key is required to change the bell tension, and often a screwdriver is used as a lever to increase/decrease tension if friction in the system becomes so great that the spring does not generate sufficient force. Belt tension directly contributes to throughput, but this prior art tensioner was not sufficient for use in the DBCS 7 sorting machine.

The embodiment in the drawings requires an input of 10-20 revolutions of the knob to create a linear translation of 1 mm depending on the installed worm drive. By matching the worm and lead screw, any relationship between revolutions and translation is possible. The maximum torque on the input is approximately 7 in-lbs to exert approximately a 500 Newton force.

Use of the tensioner of the invention is not limited to pickoff mechanisms. The tensioner of the invention could be used anywhere an idler roller appears on a pinch belt mail sorting machine such as in chain drives and serpentine belts.

Travel of the arm 26 can easily be scaled up to provide the force over longer distances. The device also lends itself to automatic tensioning. A single speed motor could be attached to the torque limited input and operated daily to ensure that the belt tension is always correct.

Although several embodiments of the present invention have been described in the foregoing detailed description and illustrated in the accompanying drawings, it will be understood by those skilled in the art that the invention is not limited to the embodiments disclosed but is capable of numerous rearrangements, substitutions and modifications without departing from the spirit of the invention. Instead of using a worm gear to provide the self locking action, it is possible instead to tighten set screw 18. Such modifications are within the scope of the invention as expressed in the appended claims.

The invention claimed is:

1. A tensioning device configured for use in a conveyor system as an idler roller over which a belt is wound under tension, comprising:
   a housing,
   an arm disposed in the housing for linear movement into and out of the housing;
   a roller mechanism mounted at a distal end of the arm, including a roller configured for rolling contact with a belt of a conveyor system;
   an actuator for extending and retracting the arm from the housing, the actuator including a worm shaft and a lead screw wherein a pinion of the worm shaft engages a gear affixed at one end of the lead screw;

a coupling by which rotation of the lead screw results in outward movement of the arm when the worm shaft is rotated in a first direction, and which results in inward movement of the arm when the worm shaft is rotated in a second direction opposite the first direction; and wherein engagement of the worm shaft to the gear is self-locking.

2. The device of claim 1, further comprising a slip clutch connected to the actuator to prevent rotation of the worm shaft when the force required to turn the worm shaft exceeds a predetermined level.

3. The device of claim 1, wherein the lead screw is oriented perpendicularly to the worm shaft in the housing.

4. The device of claim 2, wherein the actuator includes a manually rotatable knob and the slip clutch prevents rotation of the worm shaft in response to rotation of the knob.

* * * * *